US007920696B2

(12) United States Patent
Chew

(10) Patent No.: US 7,920,696 B2
(45) Date of Patent: Apr. 5, 2011

(54) METHOD AND DEVICE FOR CHANGING TO A SPEAKERPHONE MODE

(75) Inventor: Kee (Basil) Joo Chew, Singapore (SG)

(73) Assignee: Motorola Mobility, Inc., Libertyville, IL (US)

( * ) Notice: Subject to any disclaimer, the term of this patent is extended or adjusted under 35 U.S.C. 154(b) by 1146 days.

(21) Appl. No.: 11/610,971

(22) Filed: Dec. 14, 2006

(65) Prior Publication Data
US 2008/0144806 A1 Jun. 19, 2008

(51) Int. Cl.
*H04M 1/03* (2006.01)
(52) U.S. Cl. ............. 379/388.02; 379/93.19; 379/157; 379/202.01; 379/399.01; 379/406.06; 455/569.1; 704/225
(58) Field of Classification Search .......... 250/221; 345/173; 379/211.02, 355.01, 387.02, 388.02, 379/388.04, 428.01, 390.01, 93.19, 100.16, 379/157, 202.01, 392.01, 399.01, 406.05, 379/406.06, 406.08; 455/41.2, 556.1, 569.1, 455/575.1, 462, 469.1; 348/14.12; 704/225
See application file for complete search history.

(56) References Cited

U.S. PATENT DOCUMENTS

| | | | | |
|---|---|---|---|---|
| 4,907,258 A * | 3/1990 | Kamitomo | ............ | 379/157 |
| 5,175,759 A * | 12/1992 | Metroka et al. | ............ | 455/569.1 |
| 5,224,151 A * | 6/1993 | Bowen et al. | ............ | 455/569.1 |
| 5,297,198 A * | 3/1994 | Butani et al. | ............ | 379/388.04 |
| 5,612,996 A * | 3/1997 | Li | ............ | 379/406.06 |
| 5,692,042 A * | 11/1997 | Sacca | ............ | 379/390.01 |
| 5,715,302 A * | 2/1998 | Lee | ............ | 379/100.16 |
| 5,915,003 A * | 6/1999 | Bremer et al. | ............ | 379/93.19 |
| 6,212,273 B1 * | 4/2001 | Hemkumar et al. | ..... | 379/406.08 |
| 6,230,029 B1 | 5/2001 | Hahn et al. | | |
| 6,359,983 B1 * | 3/2002 | Krone et al. | ............ | 379/399.01 |
| 6,411,828 B1 * | 6/2002 | Lands et al. | ............ | 455/569.1 |
| 6,453,041 B1 * | 9/2002 | Eryilmaz | ............ | 379/392.01 |
| 6,507,653 B1 * | 1/2003 | Romesburg | ............ | 379/406.05 |
| 6,547,620 B1 | 4/2003 | Hatamura et al. | | |
| 6,618,478 B1 * | 9/2003 | Stuckman et al. | ............ | 379/355.01 |
| 6,738,643 B1 * | 5/2004 | Harris | ............ | 455/556.1 |
| 7,027,804 B2 | 4/2006 | Mufti et al. | | |
| 7,123,715 B2 * | 10/2006 | Leung | ............ | 379/428.01 |
| 7,170,545 B2 * | 1/2007 | Rodman | ............ | 348/14.12 |
| 7,196,316 B2 * | 3/2007 | Chan et al. | ............ | 250/221 |

(Continued)

FOREIGN PATENT DOCUMENTS

EP 1838075 B1 9/2008

(Continued)

OTHER PUBLICATIONS

Banerjea, Robin: "Supplementary European Search Report", European Patent Office, Munich, Jul. 16, 2010, all pages.

*Primary Examiner* — Gerald Gauthier

(57) ABSTRACT

A method (200), and electronic communication device (100), for automatically selectively changing from one mode of operation to a speakerphone mode of operation after a call on the electronic communication device (100) is established. The method (200), and electronic communication device (100), perform establishing a call (210) using a first mode of operation that is a mode of operation other than the speakerphone mode of operation. Then there is performed changing automatically (235) from the first mode of operation to the speakerphone mode of operation when a signal amplitude provided by a microphone used in the first mode of operation does not reach a threshold level before an expiration of a predetermined time period.

15 Claims, 2 Drawing Sheets

U.S. PATENT DOCUMENTS

| | | | |
|---|---|---|---|
| 7,283,788 B1 * | 10/2007 | Posa et al. | 455/41.2 |
| 7,376,557 B2 * | 5/2008 | Specht et al. | 704/225 |
| 7,742,588 B2 * | 6/2010 | Rodman et al. | 379/202.01 |
| 2003/0008689 A1 | 1/2003 | Uda | |
| 2004/0185920 A1 * | 9/2004 | Choi et al. | 455/575.1 |
| 2005/0037782 A1 * | 2/2005 | Diethorn et al. | 455/462 |
| 2005/0141691 A1 * | 6/2005 | Wengrovitz | 379/211.02 |
| 2005/0219223 A1 * | 10/2005 | Kotzin et al. | 345/173 |
| 2006/0073819 A1 | 4/2006 | Lowles | |
| 2008/0144805 A1 * | 6/2008 | Chew | 379/387.02 |
| 2008/0144806 A1 * | 6/2008 | Chew | 379/388.02 |

FOREIGN PATENT DOCUMENTS

| | | |
|---|---|---|
| GB | 2359947 A | 9/2001 |

* cited by examiner

METHOD AND DEVICE FOR CHANGING TO A SPEAKERPHONE MODE

FIELD OF THE INVENTION

The present invention relates generally to electronic communication devices, and in particular to changing from one mode of operation to a speakerphone mode of operation after a call on an electronic communication device is established.

BACKGROUND

A telephone call on a mobile telephone can be typically established using an earpiece mode of operation, headset mode of operation or a speakerphone mode of operation. The headset mode of operation requires an external headset accessory, comprising an earpiece and microphone, to be operatively coupled to the telephone by wires or a radio link. The earpiece mode of operation is a conventional telephone mode of operation where audio data concerning an established call, such as voice data, is emitted using a low volume speaker that is an integral part of the telephone. In the earpiece mode of operation the audio data is generally heard only when an earpiece of the telephone is held close to a user's ear. The speakerphone mode of operation generally emits audio data at a higher volume so that the audio data can be heard by a callee from a reasonable distance, such as 1-4 feet from the speaker that is an integral part of the telephone. Similarly, the earpiece mode of operation generally uses a less sensitive telephone microphone setting because user generally speaks directly into a telephone microphone when using an earpiece mode of operation. In contrast, the speakerphone mode of operation generally uses a more sensitive telephone microphone setting because a speakerphone mode of operation is generally intended to receive sounds from a reasonable distance, such as 1-4 feet from the speaker that is an integral part of the telephone.

The earpiece mode of operation is generally activated on a mobile telephone, for instance when answering an incoming call, by pressing an answer key located on a keypad of the telephone. The speakerphone mode of operation is generally activated on a mobile telephone using a soft key that is selected from a menu shown on a display screen of a telephone. Also, the headset mode of operation requires an external headset accessory to be either physically coupled to the mobile telephone or wireless coupled by using soft keys.

Answering or establishing a call on mobile telephone using an earpiece answer mode while simultaneously performing an activity where a user's hands and vision are preoccupied can be cumbersome. Various devices and techniques for enabling mobile telephones to be answered in a hands-free and head-up manner have therefore been developed. Such devices and techniques include the use of peripheral devices such as docking stations and the abovementioned headset accessories that enable a mobile telephone to be answered when a user is not holding the telephone. For example, a mobile telephone docking station attached to a vehicle's dashboard can be wirelessly coupled to a headset, or can cause a mobile telephone to automatically answer an incoming call in a speakerphone answer mode when a mobile telephone is positioned in the docking station.

However headset accessories must be either physically coupled or wireless coupled to the mobile telephone before they can be used and such accessories are extra equipment that need to be carried along with a mobile telephone. Further, peripheral devices such as docking stations can be bulky and are generally not easily portable, and thus are often conveniently useable only in a single location, such as in a single vehicle.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
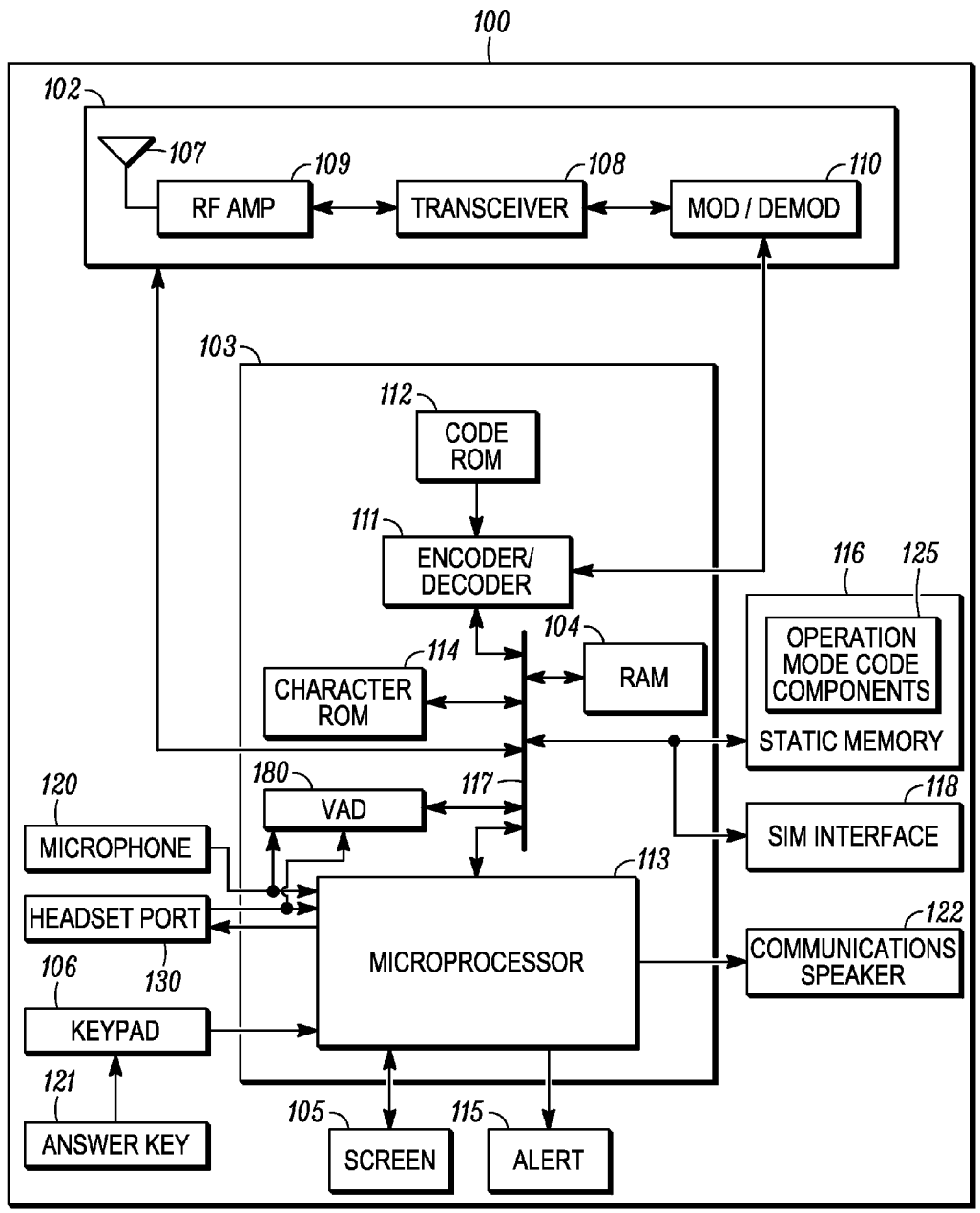
FIG. 1 is a schematic diagram illustrating an electronic communication device in the form of a mobile telephone according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and device components related to a method and device for answering an incoming call. Accordingly, the device components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a method, system or apparatus that comprises a list of elements does not include only those elements but may include other elements not expressly listed or inherent to such method, system or apparatus. An element preceded by "comprises a . . . " does not, without more constraints, preclude the existence of additional identical elements in the method, system or apparatus that comprises the element.

Referring to FIG. 1, a schematic diagram illustrates an electronic communication device in the form of a mobile telephone 100 that performs a method of answering an incoming call, according to some embodiments of the present invention. The mobile telephone 100 comprises a radio frequency communications unit 102 coupled to be in communication with a processor 103. The mobile telephone 100 also has a keypad 106 and a display screen 105, such as a touch screen, coupled to be in communication with the processor 103. Typically, a conventional multifunction key that can function as an answer key 121 is located on the keypad 106.

The processor 103 includes an encoder/decoder 111 with an associated code Read Only Memory (ROM) 112 for storing data for encoding and decoding voice or other signals that may be transmitted or received by the mobile telephone 100. The processor 103 also includes a microprocessor 113 coupled, by a common control, data and address bus 117, to the encoder/decoder 111, a character Read Only Memory (ROM) 114, the radio frequency communications unit 102, a Voice Activity Detection module (VAD) 180, a Random Access Memory (RAM) 104, programmable static memory 116 and a Subscriber Identity Module (SIM) interface 118. The programmable static memory 116 and a SIM operatively coupled to the SIM interface 118 each can store, among other things, selected incoming text messages, a Telephone Number Database (TND) comprising a number field for telephone numbers and a name field for identifiers associated with one of the numbers in the name field.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that couples the communications unit 102 to the processor 103.

The microprocessor 113 has ports for coupling to the keypad 106, to the screen 105, and to an alert module 115 that typically contains an alert speaker (that is a high power output speaker that can be a polyphonic speaker), vibrator motor and associated drivers. Also, the microprocessor 113 has ports for coupling to a headset port 130, a microphone 120 and to a communications speaker 122. The character ROM 114 stores code for decoding or encoding data such as text messages that may be received by the communications unit 102. Also, the VAD module 180 has inputs coupled to outputs of the microphone 120 and headset port 130. In this embodiment the VAD module 180 is implemented in hardware, however the VAD module 180 may be implemented in firmware of software. In some embodiments of the present invention, the character ROM 114, the programmable memory 116, or a SIM also can store operating code (OC) for the microprocessor 113 and code for performing functions associated with the mobile telephone 100. For example, as described above, the programmable memory 116 can comprise computer readable operation mode code components 125 that can be used to execute a method of the present invention.

According to one embodiment of the present invention, there is provided a method for automatically selectively changing from one mode of operation to a speakerphone mode of operation after a call on an electronic communication device is established, the method comprising establishing a call, using a first mode of operation that is a mode of operation other than the speakerphone mode of operation. The method also provides for changing automatically from the first mode of operation to the speakerphone mode of operation when a signal amplitude provided by a microphone used in the first mode of operation does not reach a threshold level before an expiration of a predetermined time period.

According to another embodiment of the present invention, there is provided a device for automatically selectively changing from one mode of operation to a speakerphone mode of operation after a call on an electronic communication device is established, the device comprising a computer readable operation mode code components configured to cause the device to establish a call, using a first mode of operation that is a mode of operation other than the speakerphone mode of operation. The device also comprises a computer readable operation mode code components configured to cause the device to change automatically from the first mode of operation to the speakerphone mode of operation when a signal amplitude provided by a microphone used in the first mode of operation does not reach an amplitude detection threshold before an expiration of a predetermined time period.

Figure 2:
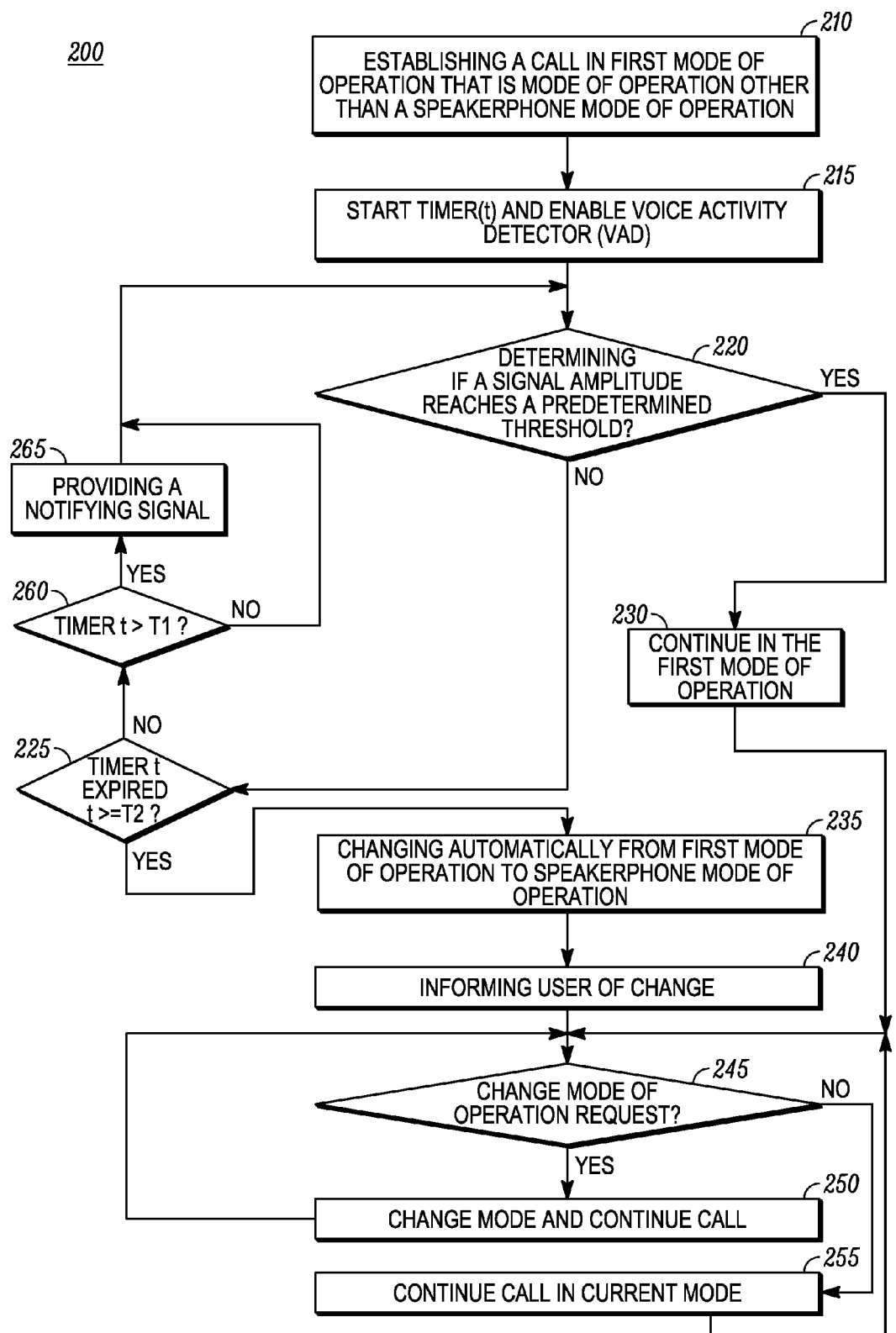
FIG. 2 is a general flow diagram illustrating a method for automatically selectively changing from one mode of operation to a speakerphone mode of operation, the method being performed on the electronic communication device of FIG. 1 in accordance with some embodiments of the present invention.

Referring to FIG. 2, a general flow diagram illustrates a method 200 for automatically selectively changing from one mode of operation to a speakerphone mode of operation after a call on an electronic communication device, such as the mobile telephone 100, is established in accordance with some embodiments of the present invention. At a step 210, the mobile telephone 100 provides for establishing a call, using a first mode of operation that is a mode of operation other than the speakerphone mode of operation. For example, the call can be established by the mobile telephone 100 being configured to allow an incoming call to be answered in the first mode of operation such as a an earpiece mode of operation or a headset mode of operation. In the earpiece mode of operation the communications speaker 122, that is an integral part of the mobile telephone 100, is set to a low volume and the microphone 120, that is also an integral part of the mobile telephone 100, is set to low sensitivity. In one alternative, in the headset mode of operation a wired or wireless (typically by radio connection) headset is operatively coupled to communicate with the mobile telephone 100 through the headset port 130. The incoming call can be answered in response to an answer call signal processed by the microprocessor 113 in response to a user pressing the answer key 121 on the keypad 106 of the mobile telephone 100.

It will be apparent to a person skilled in the art that the call can be established by the mobile telephone 100 being configured to allow a user to dial a telephone number by accessing a number in a phonebook (the Telephone Number Database (TND)), stored in the programmable static memory 116, or by simply entering a phone number and actuating a call key on the keypad 106. Again, the call can be established by the mobile telephone 100 being configured to allow an incoming call to be established in the first answer mode of operation such as a an earpiece mode of operation or a headset mode of operation.

At a step 215 the method 100 performs a start timer (t) operation and enables the VAD module 180 to analyze signals at the outputs of both the microphone 120 and headset port 130. At a test block 220, a test is performed and provides for determining if a signal amplitude detected by the VAD module 180 reaches a predetermined threshold. As will be apparent to a person skilled in the art, the signal amplitude detected by the VAD module 180 is the signal amplitude derived from a speech signal that is received and analyzed by the VAD module 180.

If it is determined at block 220 that the signal amplitude detected by the VAD module 180 has reached the predetermined threshold then, at a block 230, the call established by the mobile telephone 100 continues in the first mode of operation and the method 200 then goes to a test block 245 described below. Thus, because the signal amplitude detected by the VAD module 180 has reached the predetermined threshold it is presumed that the user: a) has the mobile telephone 100 up against his face and is able to communicate using the earpiece mode of operation; or b) that the user is wearing a connected headset and using the headset mode of operation.

If at the test step 220 it is determined that signal amplitude detected by the VAD module 180 has not reached the predetermined threshold then the method 200 performs a test, at a test block 225, to check if the timer (t) has expired (e.g. timer (t) has been running for a time duration T2).

If it is determined, at test block 225, that the timer (t) has not expired then the method 200 checks, at a test block 260, if the timer (t) has been running for a time duration>T1, (where T2>T1). If the timer (t) has not been running for a time duration>T1 then the method 200 returns to test block 220 and the method 200 again provides for determining if a signal amplitude detected by the VAD module 180 reaches the predetermined threshold. Alternatively, if at the test block 260, it is determined that the timer (t) has been running for a time duration>T1 then, at a block 265, the method 200 provides for alerting the user. The alerting the user is effectred by providing a notifying signal to the user that the mobile telephone 100 is about to perform an operation of changing automatically from the first mode of operation to the speakerphone mode of operation. This alerting is emitted typically from the alert module 115 with a synthesized speech message such as "Unless you speak louder, this telephone will change to a speakerphone mode of operation in approximately 2 seconds". The method 200 returns to test block 220 and the method 200 again provides for determining if a signal amplitude detected by the VAD module 180 reaches the predetermined threshold. If the user has the mobile telephone against his head or is using the headset mode of operation, the user may then speak louder so that the VAD module 180 can provide an output signal so that signal amplitude detected by the VAD module 180 reaches the predetermined threshold.

If it is determined, at test block 225, that the timer (t) has expired the method 200 performs, at a block 235, changing automatically from the first mode of operation to the speakerphone mode of operation. Hence, it will be apparent top a person skilled in the art that the changing automatically from the first mode of operation to the speakerphone mode of operation occurs when the signal amplitude provided by the microphone 120 that is integral with the mobile telephone 100 or by an external microphone coupled to the headset 130, and used in the first mode of operation does not reach a threshold level before an expiration of a predetermined time period. This predetermined time period is a time period from the start timer (t) until the timer (t) expires at time T2.

The method also performs, at a block 240, process of informing the user of the change of mode of operation. This informing the user of the changing of mode of operation is typically effected by the alert module 115 emitting a suitable notice that can include synthesized speech such as the phrase "Changed to Speakerphone mode of operation".

At the test block 245, the user can input at the keypad 106 a change mode of operation request, if no request is detected then the method 200 continues the call in the current mode of operation and the method 200 returns to test block 245. However, if a request is detected at the test block 245, then the mode of operation is changed to a mode selected by the user at a block 250 and the method 200 returns to test block 245. After either pock 250 or 255, the method 200 returns to test block and the method 200 ends after the call is terminated.

Those skilled in the art will recognize that the present invention further can be embodied in a electronic communication device that in this typically the mobile telephone 100. The programmable static memory 116 can comprise a computer readable medium such as a random access memory (e.g., static random access memory (SRAM), read only memory (e.g., programmable read only memory (PROM), or erasable programmable read only memory (EPROM)), or hybrid memory (e.g., FLASH) as is well known in the art. The medium then comprises operation mode code components 125 that, when processed by the microprocessor 113, are configured to cause execution of the above described steps of the method 200.

Advantageously, the present invention can provide convenient use because, for example, users who seek hands-free operation of an electronic communication device (the mobile telephone 100) can allow the device to automatically change the modes of operation after establishing a call in an earpiece or the headset mode of operation. Thus, by typically by answering an incoming call and then by simply keeping silent and waiting for expiration of a predetermined time period (t) after the call is established, the earpiece or the headset mode of operation will be changed automatically to the speakerphone mode of operation. For example, if a user of the mobile telephone 100 is driving and wishes to use the speakerphone mode of operation, the user can answer the call for instance in the earpiece or headset mode of operation (if the headset is operatively coupled to the telephone 100) by actuating the answer key 121. If the VAD module 180 cannot detect a sufficiently large amplitude audio signal within a predetermined time period after the incoming call is answered, the mobile telephone 100 automatically changes to the desired speakerphone mode of operation. Also, before changing the mode of operation, the user is alerted (notified) and the user can simply raise their voice so that the mode of operation is not changed.

As will be apparent to a person skilled in the art, the device in the form of the mobile telephone 100 advantageously comprises computer readable operation mode code components 125 configured to cause the mobile telephone 100 to establish a call, using a first mode of operation that is a mode of operation other than the speakerphone mode of operation. The computer readable operation mode code components 125 are further configured to cause the mobile telephone 100 to change automatically from the first mode of operation to the speakerphone mode of operation when a signal amplitude provided by the microphone 120, and detected by the VAD module 180, used in the first mode of operation does not reach an amplitude detection threshold before an expiration of the predetermined time period T2.

It will be appreciated that embodiments of the invention described herein may be comprised of one or more conventional processors and unique stored program instructions that control the one or more processors to implement, in conjunction with certain non-processor circuits, some, most, or all of the functions of answering an incoming call to an electronic communication device as described herein. The non-processor circuits may include, but are not limited to, a radio receiver, a radio transmitter, signal drivers, clock circuits, power source circuits, and user input devices. As such, these functions may be interpreted as steps of a method for answering an incoming call to an electronic communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

I claim:

1. A method for automatically selectively changing from one mode of operation
   to a speakerphone mode of operation after a call on an electronic communication device is established, the method comprising:
   establishing a call, using a first mode of operation that is a mode of operation other than the speakerphone mode of operation; and
   changing automatically from the first mode of operation to the speakerphone mode of operation when a signal amplitude provided by a microphone used in the first mode of operation does not reach a threshold level before an expiration of a predetermined time period; thereafter, upon expiration of the predetermined time period, a change of mode of operation is initiated by manual input.

2. The method of claim 1, wherein the first mode of operation is an earpiece mode of operation.

3. The method of claim 1, wherein the first mode of operation is a headset mode of operation.

4. The method of claim 1, wherein after the changing automatically there is provided a further step of informing a user of the changing.

5. The method of claim 1, further comprising providing a notifying signal to a user indicating that device is about to perform the changing automatically from the first mode of operation to the speakerphone mode of operation.

6. The method of claim 1, wherein the microphone is integral with the device.

7. The method of claim 1, wherein the microphone is an external microphone.

8. The method of claim 7, wherein the microphone is coupled to a headset port of the device.

9. The method of claim 1, wherein the microphone is part of a headset coupled to the headset port.

10. The method of claim 1, wherein signal amplitude is derived from a speech signal.

11. A device for automatically selectively changing from one mode of operation
    to a speakerphone mode of operation after a call on an electronic communication device is established, the device comprising:
    computer readable operation mode code components configured to cause the device to establish a call, using a first mode of operation that is a mode of operation other than the speakerphone mode of operation, wherein the computer readable operation mode code components are further configured to cause the device to change automatically from the first mode of operation to the speakerphone mode of operation when a signal amplitude provided by a microphone used in the first mode of operation does not reach an amplitude detection threshold before an expiration of a predetermined time period; thereafter, upon expiration of the predetermined time period, a change of mode of operation is initiated by manual input.

12. The device of claim 11, wherein the first mode of operation is an earpiece mode of operation.

13. The device of claim 11, wherein the first mode of operation is a headset mode of operation.

14. The device of claim 11, wherein signal amplitude is derived from a speech signal.

15. The device of claim 11, wherein signal amplitude is provided by a voice activity detection module.

* * * * *